No. 829,904. PATENTED AUG. 28, 1906.
E. E. YOUNG.
HORSE BLANKET.
APPLICATION FILED DEC. 13, 1905.
2 SHEETS—SHEET 1.
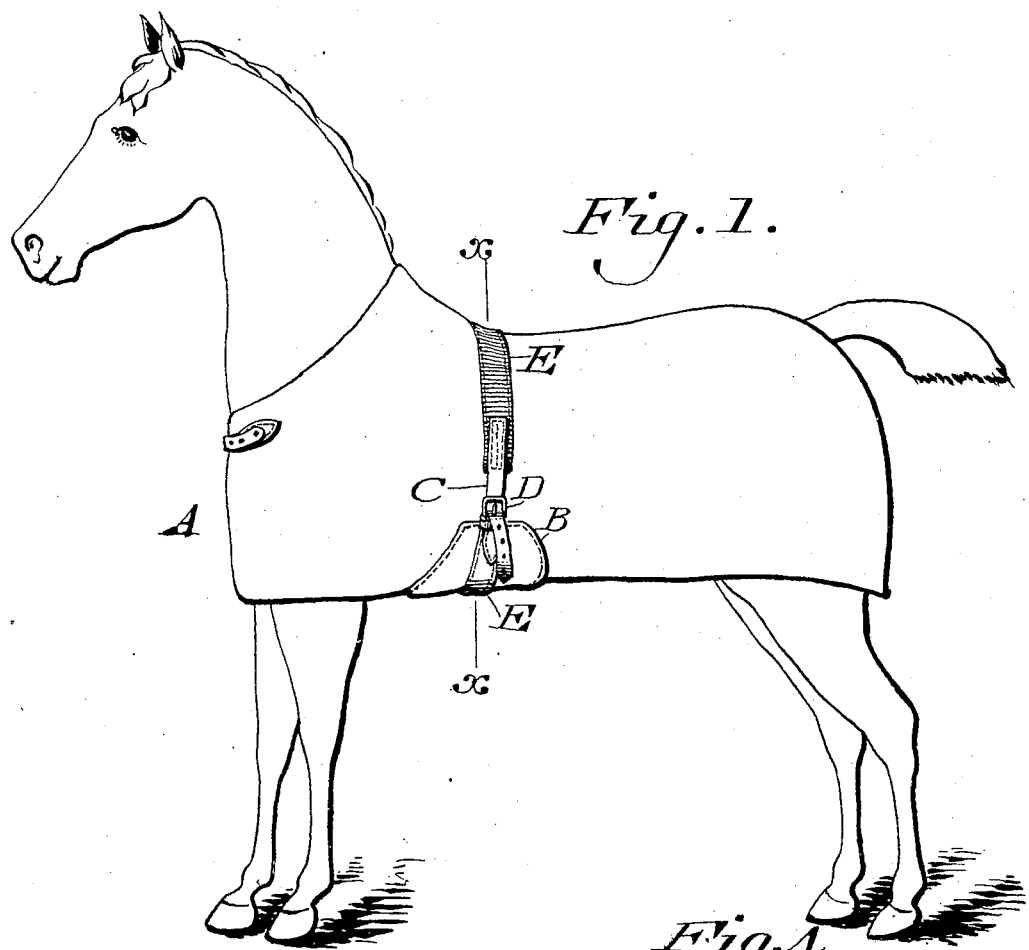
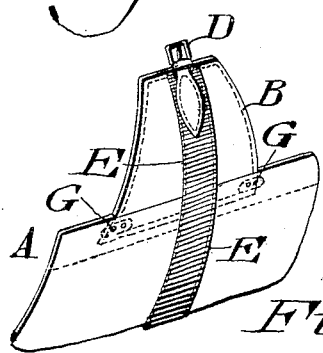
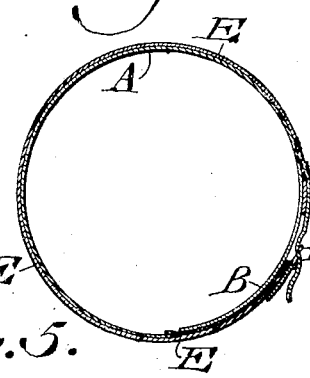
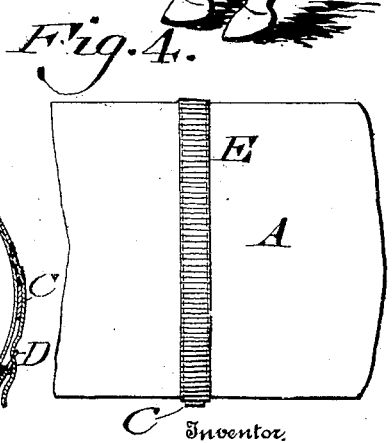
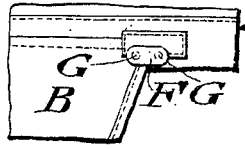
Witnesses
P. F. Nagle
L. Douville
Inventor
Edgar E. Young
By Wiederstein & Fairbank
Attorneys

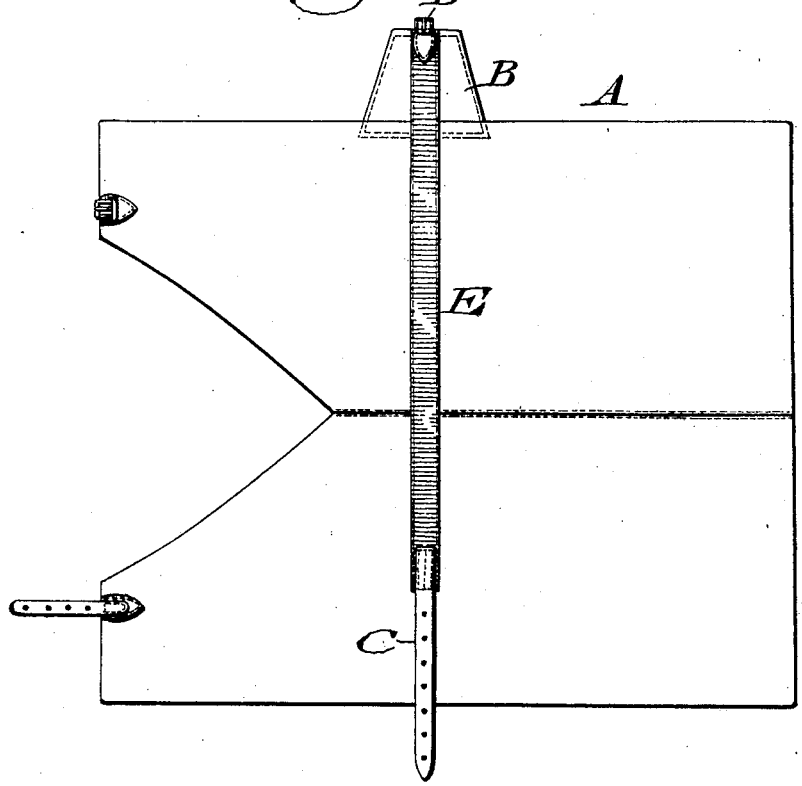

UNITED STATES PATENT OFFICE.

EDGAR E. YOUNG, OF PHILADELPHIA, PENNSYLVANIA, ASSIGNOR TO WM. B. RILEY & CO., OF PHILADELPHIA, PENNSYLVANIA, A FIRM.

HORSE-BLANKET.

No. 829,904.     Specification of Letters Patent.     Patented Aug. 28, 1906.

Application filed December 13, 1905. Serial No. 291,600.

*To all whom it may concern:*

Be it known that I, EDGAR E. YOUNG, a citizen of the United States, residing in the city and county of Philadelphia, State of Pennsylvania, have invented a new and useful Horse-Blanket, of which the following is a specification.

My invention consists of a blanket for a horse or other animal of that class provided with a flap which extends from the bottom of one side of the blanket and is adapted to pass under and around the body of the animal and then upwardly, overlapping the bottom of the opposite side, where means are provided for securing the flap to said side, thus causing the blanket to remain snugly and properly in place, provision being also made for reinforcing the blanket in the direction around the body of the animal and attaching the fastening-strap and buckle to the reinforce, so that in tightening the blanket direct strain is removed from the blanket, whereby the latter preserves its shape and its durability is increased.

Figure 1 represents a side elevation of a horse-blanket embodying my invention, the same being shown in position. Fig. 2 represents a section thereof on line *x x*, Fig. 1. Fig. 3 represents a perspective view of a portion thereof. Fig. 4 represents a top or plan view of a portion thereof. Fig. 5 represents an interior view of a detached portion of the blanket. Fig. 6 represents a plan view of the blanket in flat or laid-out condition.

Similar letters of reference indicate corresponding parts in the figures.

Referring to the drawings, A designates a horse-blanket which, excepting the feature of my invention applied thereto, is of usual construction.

B designates a flap which is downwardly continuous of the bottom of one side of the blanket and secured thereto and is adapted to be passed under the belly or body of the animal and then upwardly, so as to overlap the bottom of the opposite side of the blanket and rest on said side, as plainly shown in Fig. 1. In order to secure the flap in the position shown, I employ the strap C and buckle D, said strap being secured to the side of the blanket above the place of occupation of the flap, and the buckle being secured to the adjacent terminal of said flap, by which means the blanket may be tightened on the animal and the blanket material may contact with the under side of the belly or body instead of the harsh surcingle material heretofore employed, and the flap may be flat in position on the contiguous side portion of the blanket without crinkling the bottom of the blanket, also providing greater warmth.

E designates a girth which is connected with the flap B and extends around the same and the opposite side of the body of the blanket, then upwardly and across the back and downwardly on the side of the blanket where said flap is operatively located, said girth being secured throughout its length to said flap and the body of the blanket as a fixture thereof.

The buckle D is connected with the end of the girth of the flap B, and the strap C is connected with the terminal portion of said girth on the side of the blanket, so that said buckle and strap form continuations of the terminals of the girth, thus providing a brace which is continuous around the entire blanket, the strain caused by tightening the blanket due to the action of the belt and buckle being transmitted directly to the girth E, and thus indirectly to the blanket, whereby the latter is relieved of the direct action of such strain, thus avoiding the drawing of the blanket out of shape and injury to its wearing qualities, the girth as such possessing tensile strength and the blanket possessing the advantages stated. Furthermore, the flap is tapering from its place of connection with the bottom of the side of the body to its outer terminal, so that a single girth is sufficient to brace the same and hold it closely to and firmly on the contiguous side of the body and also to brace the top and sides of the body on which said flap is a continuity in the manner above stated. Where the sides of the flap B join the blanket, their connection therewith may be strengthened to prevent tearing away of the same. For this purpose I may employ the pads F, of leather or other suitable pliable and strong material, which are attached to adjacent portions of the flap and blanket by rivets G or other means, the effect of which is evident.

Having thus described my invention, what I claim as new, and desire to secure by Letters Patent, is—

1. A blanket having its body open at bottom, a flap connected with the bottom of one side of said body and extended freely therefrom and adapted to be passed to the bottom of the opposite side of said body and upwardly therefrom and overlap and rest on said opposite side above its bottom, a girth having a portion secured throughout its length to said body and extending entirely around the top and sides thereof, and another portion secured throughout its length to said flap and extending entirely around the same, said portions being continuities, a strap secured to the side of the body at the end of the girth above said flap and a buckle for said strap secured to the upper end of said flap at the adjacent end of said girth.

2. A blanket having its body open at bottom, a flap connected with the bottom of one side of said body and extending freely therefrom and adapted to be passed to the bottom of the opposite side of said body and upwardly therefrom and overlap and rest on said opposite side above its bottom, said flap being of tapering form from its inner place of connection with the side of the body to its outer terminal, a girth having a portion secured throughout its length to said body and extending entirely around the top and sides thereof and another portion secured throughout its length to said flap and extending entirely around the same, said portions being continuities, a strap secured to the side of the body at the adjacent end of the girth thereon and a buckle for said strap at the outer terminal of said girth secured to the narrow end of said flap.

EDGAR E. YOUNG.

Witnesses:
JOHN A. WIEDERSHEIM,
S. R. CARR.